(12) United States Patent
Harrington et al.

(10) Patent No.: US 10,676,201 B2
(45) Date of Patent: Jun. 9, 2020

(54) THREE-SPRING RAM AIR TURBINE ACTUATOR

(71) Applicants: David Harrington, Roscoe, IL (US); Paul M. Reinhard, Marengo, IL (US)

(72) Inventors: David Harrington, Roscoe, IL (US); Paul M. Reinhard, Marengo, IL (US)

(73) Assignee: Hamilton Sundstrand Corporation, Chrlotte, NC (US)

( * ) Notice: Subject to any disclaimer, the term of this patent is extended or adjusted under 35 U.S.C. 154(b) by 231 days.

(21) Appl. No.: 15/342,212

(22) Filed: Nov. 3, 2016

(65) Prior Publication Data

US 2018/0119772 A1 May 3, 2018

(51) Int. Cl.
*F16F 15/04* (2006.01)
*B64D 27/26* (2006.01)
*B64D 41/00* (2006.01)
*F16F 3/02* (2006.01)

(52) U.S. Cl.
CPC ........... *B64D 27/26* (2013.01); *B64D 41/007* (2013.01); *F16F 3/02* (2013.01)

(58) Field of Classification Search
CPC ........ F16F 15/046; F16F 3/02; B64D 41/007; B64D 27/26; F05D 2220/34; F05D 2260/52; F05D 2300/133; F01D 25/28
See application file for complete search history.

(56) References Cited

U.S. PATENT DOCUMENTS

| 4,411,596 A * | 10/1983 | Chilman | B64D 41/007 416/137 |
| 4,743,163 A * | 5/1988 | Markunas | F01D 7/02 416/137 |
| 5,820,074 A | 10/1998 | Trommer et al. | |
| 9,045,983 B2 * | 6/2015 | Russ | F01D 7/02 |
| 9,415,880 B2 | 8/2016 | Russ | |
| 2015/0096437 A1 * | 4/2015 | Russ | B64D 41/007 92/63 |

FOREIGN PATENT DOCUMENTS

DE 102004032609 A1 * 2/2006

* cited by examiner

*Primary Examiner* — Melody M Burch
(74) *Attorney, Agent, or Firm* — Locke Lord LLP; Daniel J. Fiorello; Scott D. Wofsy

(57) ABSTRACT

A ram air turbine (RAT) actuator can include an actuator housing, an actuator rod configured to move relative to the actuator housing through several positions, and a first biasing member, a second biasing member, and a third biasing member positioned and configured to bias the actuator rod relative to the actuator housing. The first biasing member biases the actuator rod from a first position through a second position, the second biasing member biases the actuator rod from the first position through a third position, and the third biasing member biases the actuator rod from the first position through a fourth position. The three biasing members can be configured to bias a ram air turbine against an uplock hook with sufficient force to eliminate vibrational damage to the uplock hook while in the first position.

13 Claims, 4 Drawing Sheets

THREE-SPRING RAM AIR TURBINE ACTUATOR

BACKGROUND

1. Field

The present disclosure relates to ram air turbines (RATs), more specifically to RAT actuators.

2. Description of Related Art

Ram air turbine (RAT) actuators are designed to overcome door and inertial loads during deployment for all conditions within the flight envelope. Traditional actuators are designed to provide a suitable force for this purpose in the worst case scenario, and nothing more.

However, existing systems allow vibratory impacting of the uplock hook of the uplock system that holds the RAT in the stowed position until programmed or manual release. This vibratory impacting can damage the uplock hook. Given that RAT systems are utilized in aircraft, simply enlarging the actuator to provide a greater force is not suitable given both weight restrictions and performance requirements for RAT deployment speed.

Such conventional methods and systems have generally been considered satisfactory for their intended purpose. However, there is still a need in the art for improved RAT actuators. The present disclosure provides a solution for this need.

SUMMARY

In accordance with at least one aspect of this disclosure, a ram air turbine (RAT) actuator can include an actuator housing, an actuator rod configured to move relative to the actuator housing through several positions, and a first biasing member, a second biasing member, and a third biasing member positioned and configured to bias the actuator rod relative to the actuator housing. The first biasing member biases the actuator rod from a first position through a second position, the second biasing member biases the actuator rod from the first position through a third position, and the third biasing member biases the actuator rod from the first position through a fourth position. The actuator rod can be moved in a same direction relative to the actuator housing while moving from the first position to the second position to the third position and to the fourth position. The three biasing members can be configured to bias a ram air turbine against an uplock hook with sufficient force to eliminate vibrational damage to the uplock hook while in the first position, wherein the elimination of vibrational damage is due to preventing relative movement between the RAT and the hook when in the first position.

In accordance with at least one aspect of this disclosure, a ram air turbine (RAT) actuator can include an actuator housing, an actuator rod disposed within the housing and configured to move relative to the housing, and a first biasing member, a second biasing member, and a third biasing member disposed in the actuator housing. The first biasing member is effective to provide first force to the actuator rod from a stowed position through a first stage, the second biasing member is effective to provide a second force to the actuator rod from the stowed position through a second stage, and the third biasing member is effective to provide a third force to the actuator rod from the stowed position through the fully deployed position. A total force provided by all three biasing members in the stowed position is configured to retain a RAT to an uplock hook to eliminate vibrational damage to the uplock hook.

The second biasing member can be disposed radially outward of the first biasing member. The third biasing member can be disposed radially outward of the second biasing member. In certain embodiments, the first biasing member can be a disk spring stack, the second biasing member can be a helical spring, and the third biasing member can be a helical spring.

In certain embodiments, the first biasing member can be made of non-flat metallic (e.g., including steel and/or any other suitable material) stacked disks. The second biasing member can be made of titanium or any other suitable material. The third biasing member can be made of titanium or any other suitable material.

In certain embodiments, the first biasing member can be captured within a first cup that includes a first base and a first sliding member that slides relative to the first base. The first sliding member can extend to a first cup maximum that corresponds to an end of the first stage such that the first sliding member pushes on the actuator housing until the end of the first stage and is then separated from the housing after the first stage.

The second biasing member can be captured within a second cup that includes a main piston and a second sliding member that slides relative to the main piston. The second sliding member can extend to a second cup maximum that corresponds to an end of the second stage such that the second sliding member pushes on the actuator housing until the end of the second stage and is then separated from the housing after the second stage. The first cup can be disposed within a pocket defined by the second sliding member.

In accordance with at least one aspect of this disclosure, a ram air turbine (RAT) system can include a RAT actuator as described above. The system can further include a RAT operatively connected to the actuator and an uplock system for holding the RAT in the stowed position.

In accordance with this disclosure, a method of preventing damage to an uplock hook of a RAT system of an aircraft can include providing a force through a RAT actuator sufficient to retain the RAT system in a first position in contact with the uplock hook under vibrational loads.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
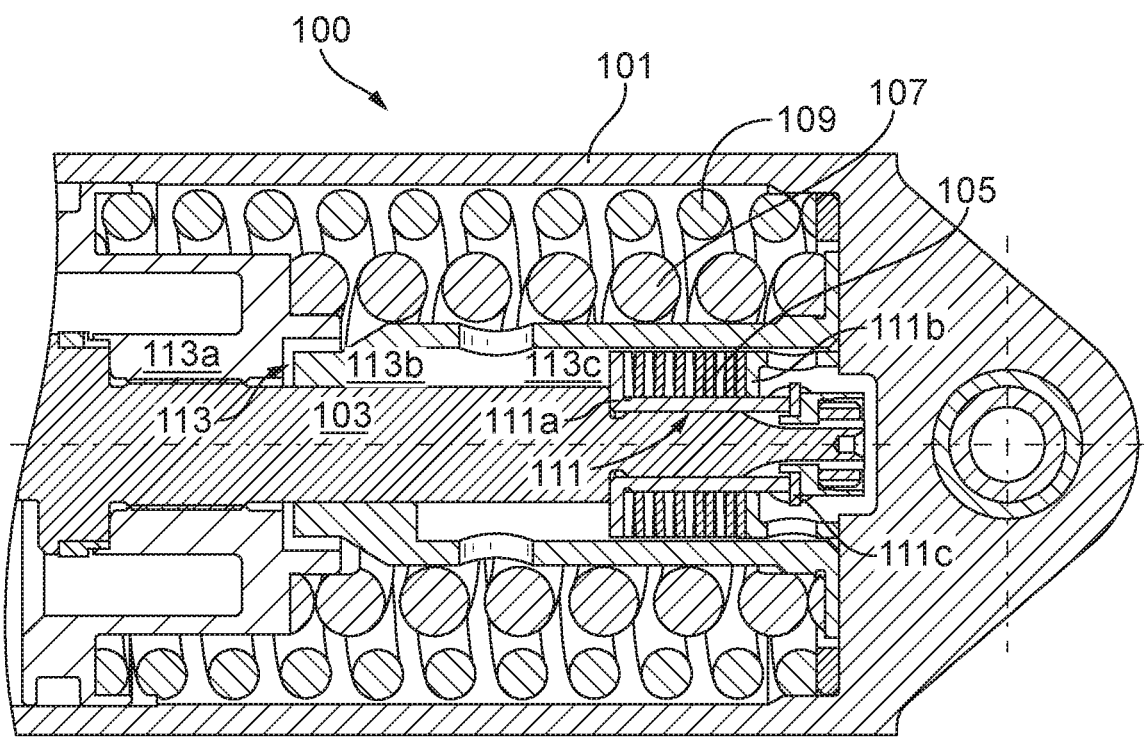
FIG. 1 is a partial cross-sectional view of an embodiment of an actuator in accordance with this disclosure, shown in the stowed position.

Reference will now be made to the drawings wherein like reference numerals identify similar structural features or aspects of the subject disclosure. For purposes of explanation and illustration, and not limitation, an illustrative view of an embodiment of an actuator in accordance with the disclosure is shown in FIG. 1 and is designated generally by reference character 100. Other embodiments and/or aspects of this disclosure are shown in FIGS. 2-7. The systems and methods described herein can be used to improve ram air turbine (RAT) retention force to eliminate vibratory damage to the uplock system while meeting size, weight, and performance restrictions.

Referring to FIG. 1, a ram air turbine (RAT) actuator 100 includes an actuator housing 101, and an actuator rod 103 (e.g., disposed at least partially within the housing 101) configured to move relative to the housing 101. The actuator 100 also includes a first biasing member 105, a second biasing member 107, and a third biasing member 109 disposed in the actuator housing 101. The biasing members 105, 107, 109 can be sized and configured to provide sufficient force to the RAT to cause it to move from the first to the fourth position against predetermined loads acting against such movement.

Figure 2:
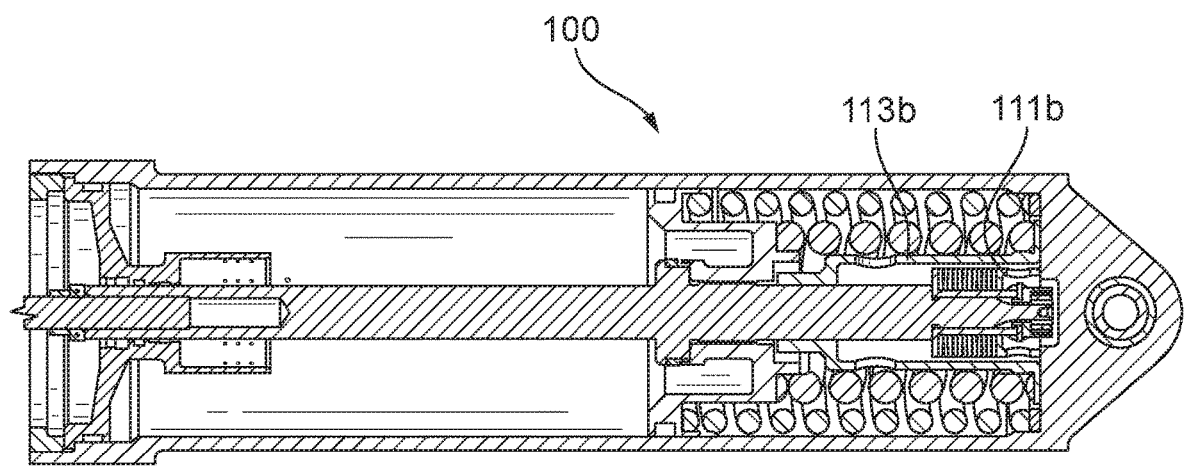
FIG. 2 is a cross-sectional view of the embodiment of FIG. 1, shown in the stowed position.
Figure 3:
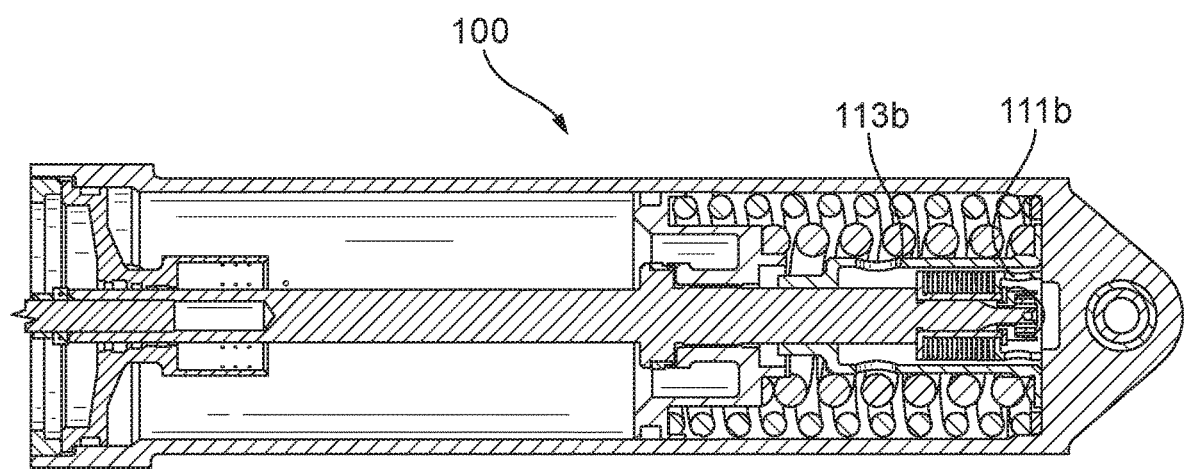
FIG. 3 is a cross-sectional view of the embodiment of FIG. 1, shown at the end of the first stage of the actuator stroke.
Figure 4:
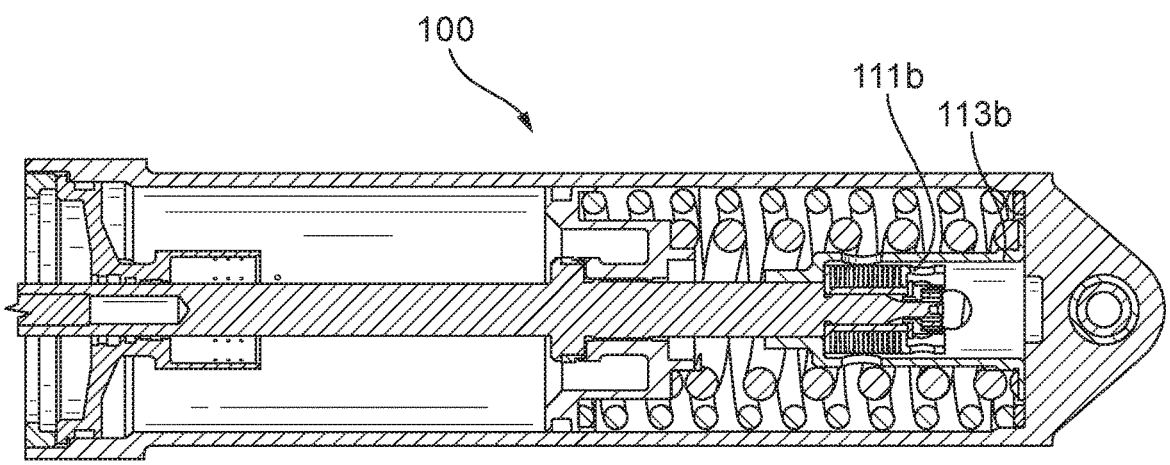
FIG. 4 is a cross-sectional view of the embodiment of FIG. 1, shown in the end of the second stage of the actuator stroke.
Figure 5:
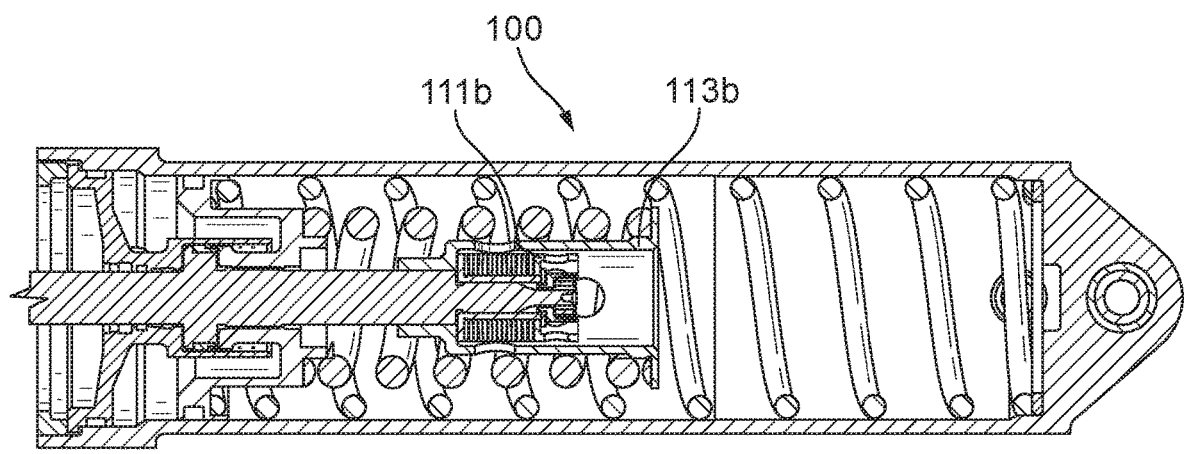
FIG. 5 is a cross-sectional view of the embodiment of FIG. 1, shown in fully actuated to the deployed position.

Referring additionally to FIGS. 2-5, the first biasing member 105 is effective to provide a first force to the actuator rod 103 from a stowed position (e.g., as shown in FIGS. 1 and 2) through a first stage (e.g., then end of which is shown in FIG. 3). The second biasing member 107 is effective to provide a second force to the actuator rod 103 from the stowed position through a second stage (e.g., then end of which is shown in FIG. 4). The third biasing member 109 is effective to provide a third force to the actuator rod 103 from the stowed position through the fully deployed position (e.g., as shown in FIG. 5). A total force provided by all three biasing members in the stowed position is configured to retain a RAT to an uplock hook to eliminate vibrational damage to the uplock hook.

As shown, the second biasing member 107 can be disposed radially outward of the first biasing member 105. The third biasing member 109 can be disposed radially outward of the second biasing member 107. Any other suitable arrangement within the housing 101 to provide the above staging is contemplated herein.

In certain embodiments, the first biasing member 105 can be a disk spring stack, the second biasing member 107 can be a helical spring, and the third biasing member can be a helical spring 109. Any other suitable biasing member types that allow generation of appropriate forces while maintaining size (e.g., 3.5 inch inner diameter of the housing 101), weight, and performance requirements (e.g., as discussed below) are contemplated herein.

In certain embodiments, the first biasing member 105 can be made of non-flat metallic (e.g., including steel and/or any other suitable material) stacked disks. The second biasing member 107 can be made of titanium or any other suitable material. The third biasing member 109 can be made of titanium or any other suitable material.

In certain embodiments, the first biasing member 105 can be captured within a first cup 111 that includes a first base 111a and a first sliding member 111b that slides relative to the first base 111a. The first sliding member 111b can extend to a first cup maximum (e.g., as shown in FIG. 3) that corresponds to an end of the first stage such that the first sliding member 111b pushes on the actuator housing 101 until the end of the first stage and is then separated from the housing 101 after the first stage (e.g., separation as shown in FIGS. 4 and 5). The first cup maximum can be defined by a flange 111c that is mounted to the rod 103 with the first base 111a and/or is formed from/extends from the first base 111a.

The second biasing member 107 can be captured within a second cup 113 that includes a main piston 113a and a second sliding member 113b that slides relative to the main piston 113a. The second sliding member 113b can extend to a second cup maximum that corresponds to an end of the second stage (e.g., as shown in FIG. 4) such that the second sliding member 113b pushes on the actuator housing 101 until the end of the second stage and is then separated from the housing 101 after the second stage (e.g., separation as shown in FIG. 5). As shown, the first cup 111 can be disposed within a pocket 113c defined by the second sliding member 113b. In certain embodiments, as shown for example, the first base 111a can define the second cup maximum by preventing the second sliding member 113b from advancing past the first base 111a.

Figure 6:
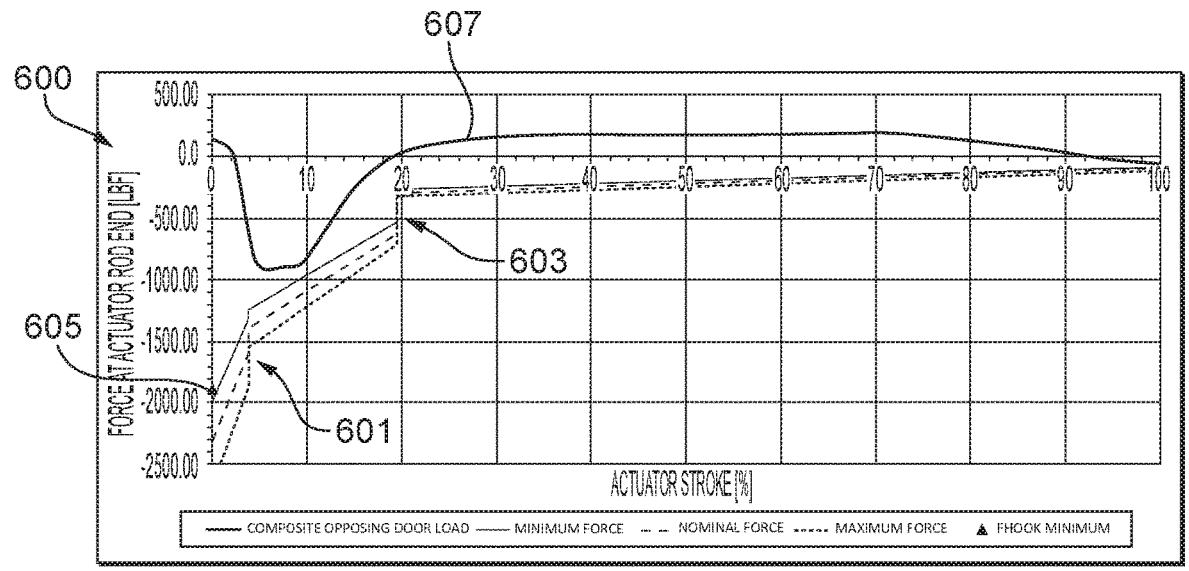
FIG. 6 is a chart showing embodiments of actuator force as a function of actuator stroke.

Referring additionally to FIG. 6, a chart 600 shows embodiments of actuator force as a function of actuator stroke for embodiments of an actuator 100 as described above. A minimum value, nominal value, and maximum value (where exceeding this would damage the uplock system) are shown charted. As can be seen, the vertical line section 601 indicates the transition point between the first stage and the second stage (e.g., at the position depicted in FIG. 3). The vertical line section 603 indicates the transition point between the second stage and the third stage (e.g., at the position depicted in FIG. 4).

Figure 7:
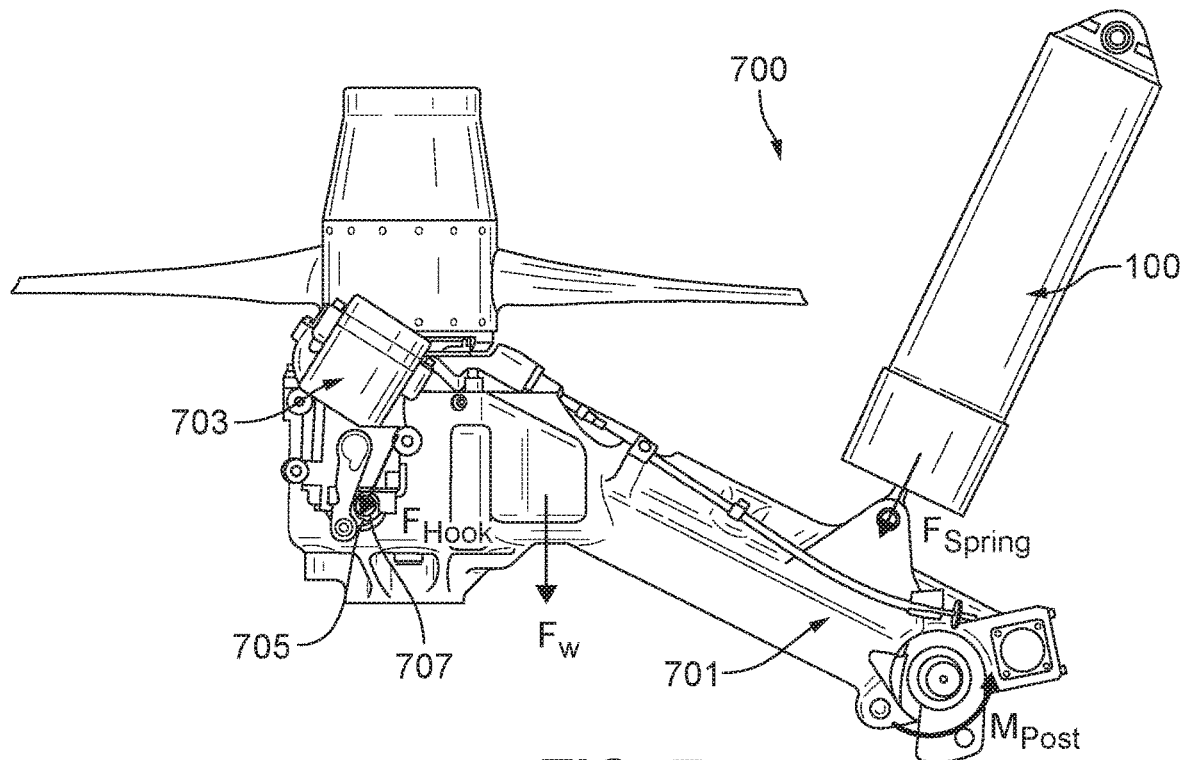
FIG. 7 is a side view of an embodiment of a system in accordance with this disclosure, shown in the stowed and locked position.

The point 605 indicates the minimum force required in the stowed position to overcome liftoff from the uplock hook, e.g., as shown in FIG. 7. In the stowed position (e.g., as shown in FIGS. 1 and 2), the force provided by the actuator 100 must be greater than the minimum force point 605 (e.g., below the point 605 on the chart as shown). Also, the force provided by the actuator 100 throughout its stroke must always be greater than the opposing load (e.g., under the opposing load line 607 as shown in the chart 600).

Example values for actuation length and work values (i.e., work done by the biasing members over the length of the stage, e.g., as shown in FIG. 7) for the minimum, nominal, and maximum forces for each stage can include the following. The first stage can include a 0.0" to 0.196" actuation stroke, a minimum work of 23.1 ft·lb, a nominal work of 25.0 ft·lb, and a maximum work of 28.3 ft·lb. The second stage can include a 0.196" to 1.299" actuation stroke, a minimum work of 30.7 ft·lb, a nominal work of 33.4 ft·lb, and a maximum work of 36.0 ft·lb. The third stage can include a 1.299" to 6.664" actuation stroke, a minimum work of 3.3 ft·lb, a nominal work of 3.6 ft·lb, and a maximum work of 3.9 ft·lb. Any other suitable values are contemplated herein.

Referring to FIG. 7, in accordance with at least one aspect of this disclosure, a ram air turbine (RAT) system 700 can include a RAT actuator 100 as described above. The system 700 can further include a RAT 701 operatively connected to the actuator 100 and an uplock system 703 for holding the RAT 701 in the stowed position. The uplock system 703 can include an uplock hook 705 configured to hold a locking feature 707 of the RAT 701. As appreciated by those skilled in the art, where $F_{hook}$ is always greater than vibratory forces, the locking feature 707 of the RAT 701 will always remain pressed against the uplock hook 705.

As described above, embodiments include three application specific biasing members that perform at specific points over the stroke of the actuator 100. Certain embodiments include a configuration that uses three biasing members in parallel while having two of biasing members captured over the stroke of the actuator 100. The biasing members are sized and selected to achieve a high enough load to prevent the RAT 701 from lifting off the uplock hook 705, but not so large to break the uplock hook 705. Embodiments provide the necessary deployment force over the entire stroke of the actuator 100 for the traditional door loads/opposing forces.

Previous technologies did not provide the necessary force to deploy the RAT under all door loads in all conditions, and further allowed vibration loads to lift the RAT 701 off of the uplock hook 705 repeatedly while stowed. Increasing the biasing member size of existing systems would require an increase in fluid volume within the actuator 100, and is not viable do to timing issues. For example, RATs are required to deploy and be capable of supplying power within 10 seconds at a temperature of −40° F. Enlarging the fluid volume in existing systems means that the actuator cannot deploy and meet the time requirement. Moreover, the actuator housing diameter is limited for practical purposes. Therefore, embodiments as described above offer superior solutions without increasing the size or decreasing the performance of the actuator.

The methods and systems of the present disclosure, as described above and shown in the drawings, provide for RAT actuators with superior properties. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A ram air turbine (RAT) actuator, comprising:
an actuator housing;
an actuator rod configured to move relative to the actuator housing through several positions; and
a first biasing member, a second biasing member, and a third biasing member positioned and configured to bias the actuator rod relative to the actuator housing,
wherein the first biasing member biases the actuator rod from a first position through a second position, the second biasing member biases the actuator rod from the first position through a third position, and the third biasing member biases the actuator rod from the first position through a fourth position, the actuator rod being moved in a same direction relative to the actuator housing while moving from the first position to the second position to the third position and to the fourth position,
wherein the three biasing members are configured to bias a ram air turbine against an uplock hook with sufficient force to eliminate vibrational damage to the uplock hook while in the first position, wherein the elimination of vibrational damage is due to preventing relative movement between the RAT and the hook when in the first position,
wherein the second biasing member is disposed radially outward of the first biasing member, wherein the third biasing member is disposed radially outward of the second biasing member, wherein the first biasing member is a disk spring stack, the second biasing member is a helical spring, and the third biasing member is a helical spring.

2. The actuator of claim 1, wherein the first biasing member is captured within a first cup that includes a first base and a first sliding member that slides relative to the first base, wherein the first sliding member can extend to a first cup maximum that corresponds to an end of a first stage such that the first sliding member pushes on the actuator housing until the end of the first stage and is then separated from the housing after the first stage.

3. The actuator of claim 2, wherein the second biasing member is captured within a second cup that includes a main piston and a second sliding member that slides relative to the main piston, wherein the second sliding member can extend to a second cup maximum that corresponds to an end of a second stage such that the second sliding member pushes on the actuator housing until the end of the second stage and is then separated from the housing after the second stage.

4. The actuator of claim 3, wherein the first cup is disposed within a pocket defined by the second sliding member.

5. The actuator of claim 1, wherein the second biasing member is made of titanium.

6. The actuator of claim 1, wherein the third biasing member is made of titanium.

7. The actuator of claim 1, wherein the disk spring stack is made of non-flat metallic stacked disks.

8. A ram air turbine (RAT) system, comprising:
a RAT actuator including:
an actuator housing;
an actuator rod configured to move relative to the actuator housing through several positions; and
a first biasing member, a second biasing member, and a third biasing member positioned and configured to bias the actuator rod relative to the actuator housing,
wherein the first biasing member biases the actuator rod from a first position through a second position, the second biasing member biases the actuator rod from the first position through a third position, and the third biasing member biases the actuator rod from the first position through a fourth position, the actuator rod being moved in a same direction relative to the actuator housing while moving from the first position to the second position to the third position and to the fourth position,
wherein the three biasing members are configured to bias a ram air turbine against an uplock hook with sufficient force to eliminate vibrational damage to the uplock hook while in the first position, wherein the elimination of vibrational damage is due to preventing relative movement between the RAT and the hook when in the first position,
wherein the second biasing member is disposed radially outward of the first biasing member, wherein the third biasing member is disposed radially outward of the second biasing member, wherein the first biasing member is a disk spring stack, the second biasing member is a helical spring, and the third biasing member is a helical spring.

9. The system of claim 8, wherein the first biasing member is captured within a first cup that includes a first base and a first sliding member that slides relative to the first base, wherein the first sliding member can extend to a first cup maximum that corresponds to an end of a first stage such that the first sliding member pushes on the actuator housing until the end of the first stage and is then separated from the housing after the first stage.

10. The system of claim 9, wherein the second biasing member is captured within a second cup that includes a main piston and a second sliding member that slides relative to the main piston, wherein the second sliding member can extend to a second cup maximum that corresponds to an end of a second stage such that the second sliding member pushes on the actuator housing until the end of the second stage and is then separated from the housing after the second stage.

11. The system of claim 10, wherein the first cup is disposed within a pocket defined by the second sliding member.

12. The system of claim 8, wherein the second biasing member is made of titanium.

13. The system of claim 8, wherein the third biasing member is made of titanium.

* * * * *